Aug. 23, 1927.
T. M. VAUGHAN
1,639,677
SHEARS
Filed Jan. 14, 1926
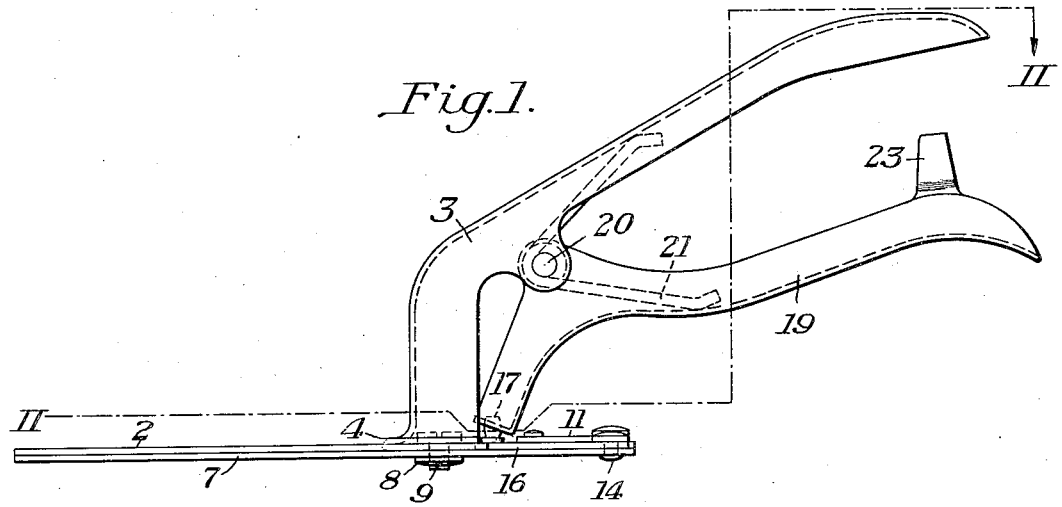
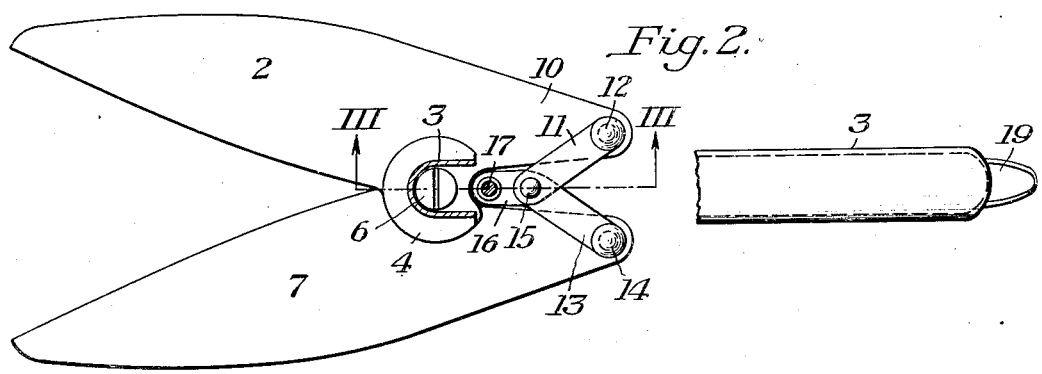
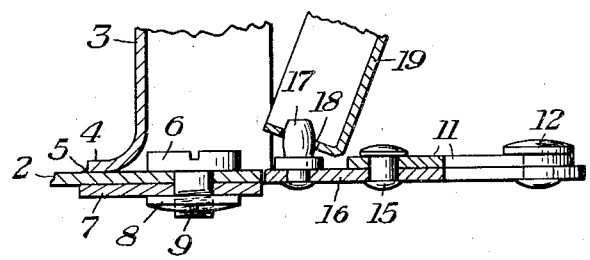
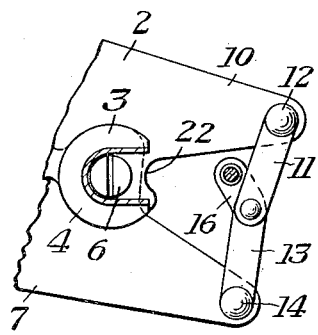
INVENTOR
Thomas M. Vaughan
by Byrnes, Stebbins & Parmelee
his attorneys Patented Aug. 23, 1927.

1,639,677

UNITED STATES PATENT OFFICE.

THOMAS M. VAUGHAN, OF SALEM, OHIO.

SHEARS.

Application filed January 14, 1926. Serial No. 81,181.

This invention relates to shears, and particularly to a hand shear for trimming grass or the like.

Grass shears as heretofore constructed have been open to numerous objections. In some types of shears the handles have been placed in the same plane as the blades, but this arrangement has been unsatisfactory in working close to the ground and it has therefore been proposed to place the blades in a plane at substantially right angles to the plane of the blades. This arrangement has made the handling of the shears less tiresome, but the manner of operatively connecting the handles to the blades has been open to numerous objections. I provide a shear with a fixed handle for supporting the blades and a movable handle for actuating the same with an intermediate toggle arrangement whereby a desirable mechanical advantage is secured. The toggle arrangement is such that the greatest mechanical advantage is secured when the shears are near their closed position. This gives considerable power at the point of the shears where it is needed and in this respect my invention provides material advantages over shears as heretofore constructed.

Preferably one blade of the shears is fixed, as this makes trimming along walks or the like considerably easier. The fixed blade is preferably secured to one handle member and it carries a pivoted toggle link which is secured to a companion link pivoted on the movable blade. One of these links is provided with an extension so disposed that a point thereon moves in a substantially straight line. The movable handle is operatively connected to the link at this point and a relatively simple connection is thus obtained.

In the accompanying drawings illustrating the present preferred embodiment of my invention:

Figure 1 is a side elevation of a shear embodying the invention;

Figure 2 is a horizontal section on the line II—II of Figure 1;

Figure 3 is a vertical section to enlarged scale taken on the line III—III of Figure 2; and Figure 4 is a view showing certain of the parts in Figure 2 in a different position.

In the illustrated embodiment of the invention there is shown a shear comprising a fixed blade 2 rigidly secured to a handle 3. The handle is provided with a foot 4 for facilitating the connection which may be made either by welding or riveting. In the drawings a welded connection 5 is shown. A pivot bolt 6 is disposed within the foot 4 and extends through the fixed blade 2 to pivotally support a movable blade 7. The pivot bolt 6 is provided with a nut 8 and a cotter pin 9 for holding the nut in place. This arrangement provides a convenient manufacturing assembly and also is relatively flat and does not interfere with the operation of the shear.

The fixed blade 2 is provided with a portion 10 extending rearwardly of the pivot bolt 6 and a toggle link 11 is pivoted to the extension 10 at 12. A corresponding link 13 is pivotally connected to the movable blade 7 at 14 and the links 11 and 13 are pivotally connected together at 15. The link 13 is provided with an extension 16 on which is mounted a stud 17. The stud 17 is barrel shaped and fits into an opening 18 in the downward extension of an operating handle 19. The operating handle 19 is pivotally connected to the handle 3 at 20 and a spring 21 is provided for urging the handle 19 to the position shown in Figure 1. At this time the shear blades are open as shown in Figure 2, but when the operator closes his hand and moves the handle 19 toward the handle 3, the stud 17 is forced backward and the toggle links 11 and 13 assume the position shown in Figure 4, thus closing the shear blades. When the handle 19 is released the spring 21 again opens the blades. It will be noted that the mechanical advantage of the toggle increases toward the end of the power stroke, thus giving extra power near the points of the shear blades. This is exceedingly desirable as the user may operate the shear for a longer time without becoming tired.

The fixed blade 2 is provided with a recess 22 into which the extension 16 of the link 13 fits. When the shear blades are opened by the spring 21 this recess provides a stop for limiting the opening of the blades. A stop 23 is provided on the handle 19 for limiting the stroke in the other direction.

The provision of the barrel shaped stud 17 prevents undue lost motion and insures smooth power transmission from the handle 19 to the shear blades.

An important feature of my invention is the extension 16 of the toggle link. The stud 17 moves in a substantially straight line so that the opening 18 need be enlarged in a sidewise direction only a very small amount if at all. With this arrangement there is no sidewise strain on the handle 19 and binding of the parts is thereby eliminated.

It will be seen from the drawings that all of the parts may be formed out of sheet metal so that the entire shear may be readily and inexpensively manufactured.

While I have illustrated a preferred form of the invention, it will be understood that it is not limited to the form shown but may be otherwise embodied within the scope of the following claims.

I claim:

1. A hand shear, comprising a pair of blades, toggle links connecting the blades, one of the links having an extension so disposed that a point thereon moves in a substantially straight line, and means connected to the extension at such point for actuating the toggle links.

2. A hand shear, comprising a fixed blade, a cooperating movable blade, toggle links connecting the blades, one of the links having an extension so disposed that a point thereon moves in a substantially straight line, and means connected to the extension at such point for actuating the links.

3. A hand shear, comprising a fixed blade, a handle having a hollow foot secured to the fixed blade, pivot means contained within the foot and extending through the fixed blade, a movable blade carried by such pivot means, toggle links connecting the blades, a movable handle secured to the first mentioned handle, and means operatively connecting the movable handle and the toggle.

4. A hand shear, comprising cooperating blades, a handle for supporting the blades, a movable handle for operating the blades, toggle links connecting the blades, and a barrel shaped stud secured to the toggle, the operating handle having an opening therein into which the barrel like stud projects.

5. A hand shear, comprising a fixed blade and a cooperating movable blade, a handle secured to the fixed blade in a plane at substantially right angles to the plane of the blades, a movable handle for operating the movable blade, such handle being pivoted to the first mentioned handle and movable in the plane thereof, toggle links connecting the blades, an extension on one of the links so disposed that a point therein moves in a substantially straight line, and a barrel like stud at such point, the movable handle being provided with an opening into which the stud fits whereby an operating connection between the movable handle and the movable blade is secured.

In testimony whereof I have hereunto set my hand.

THOMAS M. VAUGHAN.